United States Patent [19]
Conklin, Jr.

[11] Patent Number: 5,330,044
[45] Date of Patent: Jul. 19, 1994

[54] CONVEYOR WITH PLATFORM CONTAINING INDICIA

[76] Inventor: Dennis R. Conklin, Jr., 2700 North Hayden, Apt. 1108, Scottsdale, Ariz. 85257

[21] Appl. No.: 47,580

[22] Filed: Apr. 14, 1993

[51] Int. Cl.⁵ ............................................. B65G 43/00
[52] U.S. Cl. .................................. 198/502.1; 198/852
[58] Field of Search ................ 198/502.1, 850–852, 198/822

[56] References Cited

U.S. PATENT DOCUMENTS

| | | | |
|---|---|---|---|
| 3,410,390 | 11/1968 | Petersen | 198/822 |
| 3,416,645 | 12/1968 | Jones | 198/852 |
| 3,881,592 | 5/1975 | Stimpson | 198/181 |
| 4,979,591 | 12/1990 | Habegger et al. | 198/502.1 |
| 5,165,526 | 11/1992 | Conklin | 198/502.1 |
| 5,209,340 | 5/1993 | Munkner et al. | 198/502.1 |

FOREIGN PATENT DOCUMENTS

0400250A2 12/1989 European Pat. Off. .
2660785 6/1990 France .
2044715 3/1980 United Kingdom .

Primary Examiner—Joseph E. Valenza
Attorney, Agent, or Firm—Robert A. Parsons; Don J. Flickinger; Lowell W. Gresham

[57] ABSTRACT

A conveyor such as a baggage carousel (10) includes indicia (40) fastened onto the baggage carrying panels (12) of the carousel (10). Each panel (12) includes a separate portion of the indicia (40) and a series of the panels (12) can produce one total picture such as for an advertisement. The indicia (40) can be a plastic material adhered to the panels (12) and protected by another transparent sheet (42). Spacers and protective tape (36,44) are placed along the panels to protect the indicia (40) from the movement of the plates (12) and the baggage placed onto the carousel (10).

17 Claims, 5 Drawing Sheets

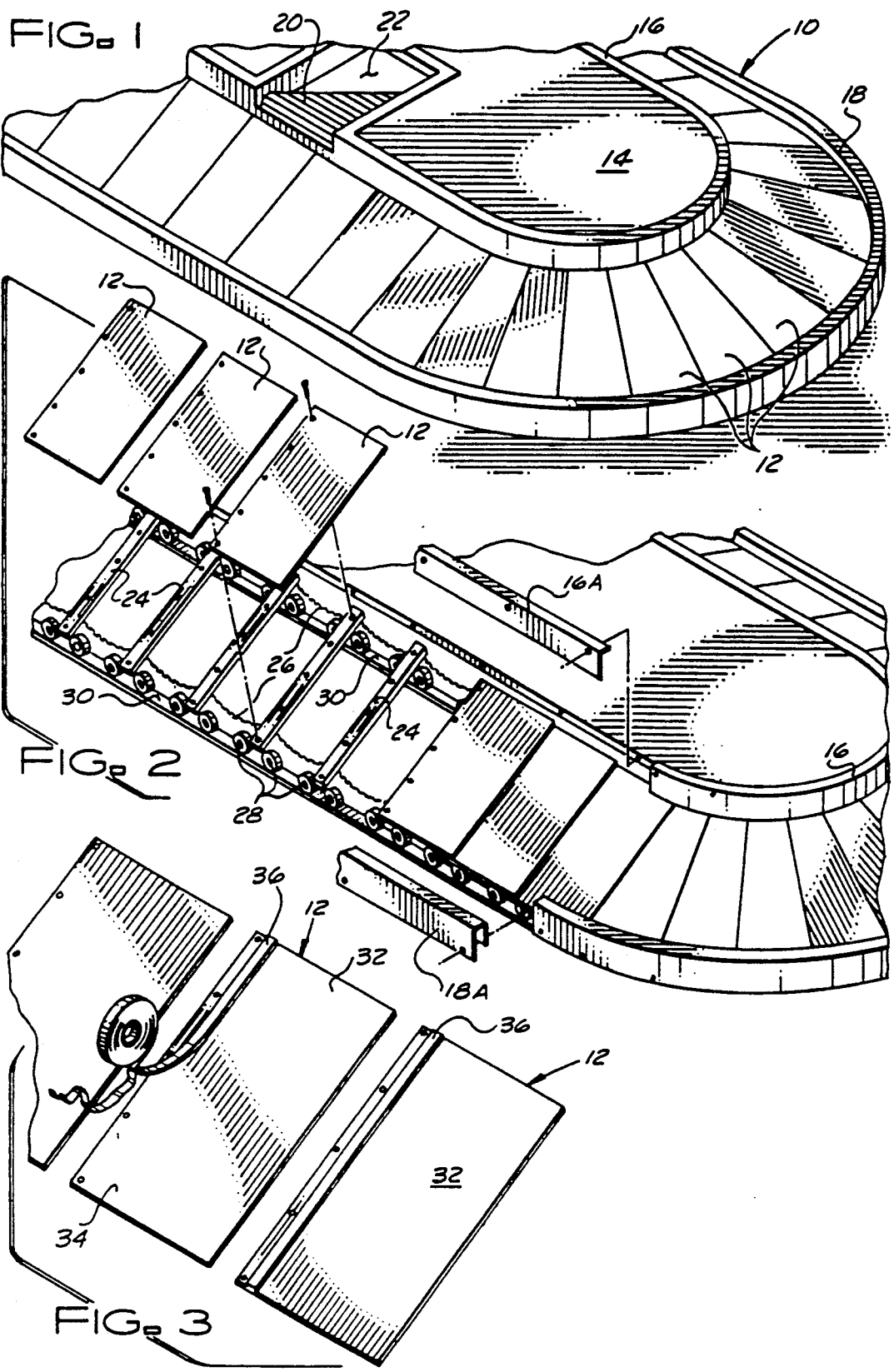

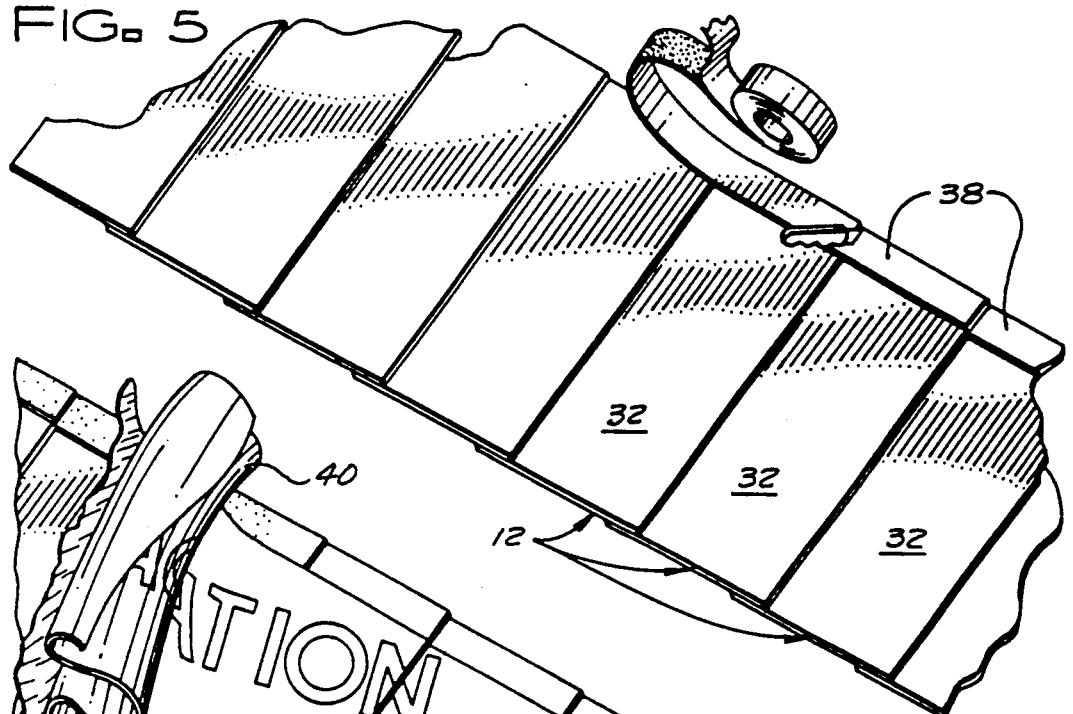
FIG. 5
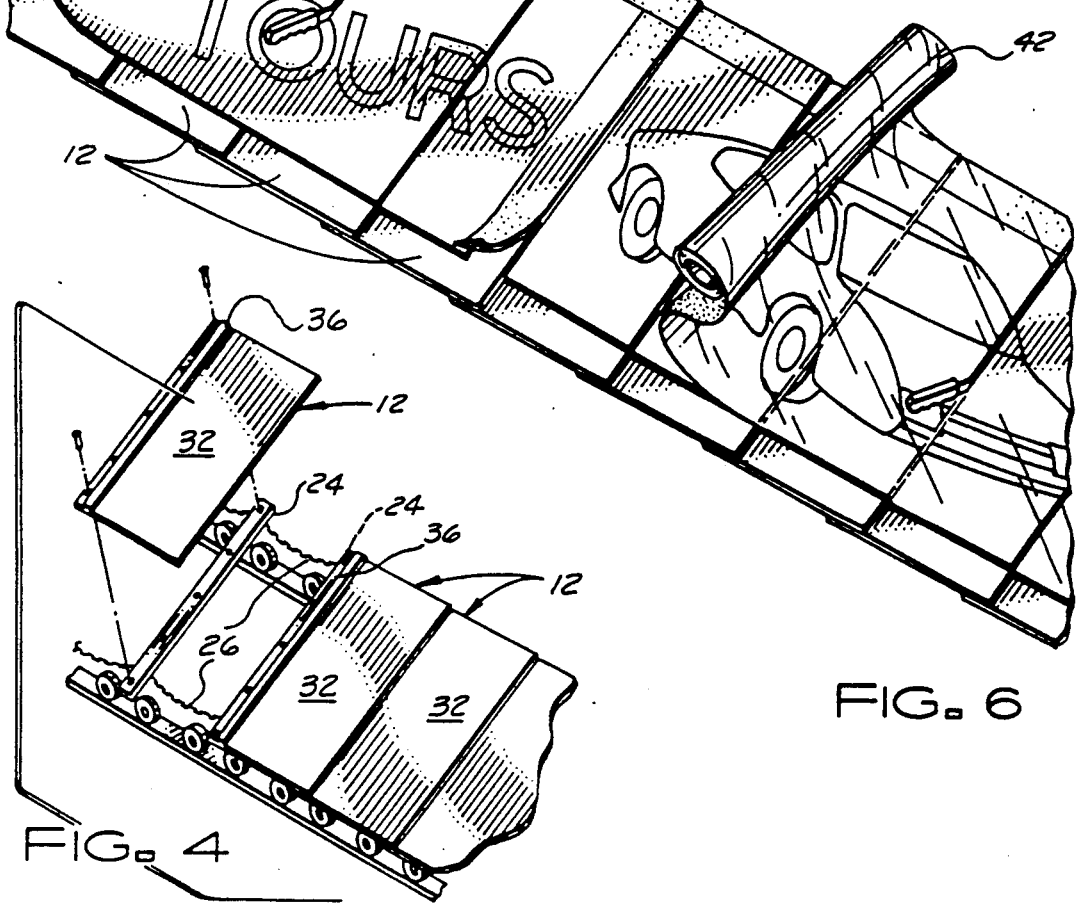
FIG. 4
FIG. 6

CONVEYOR WITH PLATFORM CONTAINING INDICIA

This application claims priority to PCT patent application No. PCT/US91/05602, filed 7 Aug. 1991.

TECHNICAL FIELD

This invention relates generally to conveyors, especially endless conveyors such as baggage carousels, and more particularly to a conveyor or a carousel wherein the load carrying platforms include indicia such as advertisements.

BACKGROUND ART

Conveyors for carrying items from one location to another location are well known in the art. Conveyors are often placed into an endless essentially circular position for dispensing baggage at an airport for instance. These endless conveyors are often called carousels because the baggage is placed onto the platform sections of the conveyor from a centrally located distributing point and the baggage is available to the passengers around either a circular or an oval pickup area. Especially in the baggage dispensing conveyors and especially in carousels in general, the platform that carries the baggage around the carousel includes a plurality of panels that are generally rectangular and overlay or abut their preceding panels to cover the circular area, especially around the ends of the oval section.

Advertisements are often placed on the center non-moving section of the carousel to display the benefits of staying in the local area around the airport or to advertise the different airlines. The advertising area is extremely limited since the people to whom the advertising is directed generally locate into one specific position around the carousel to retrieve their baggage and thereby only see a small section of the total advertising that could be placed on the non-rotating section of the carousel.

DISCLOSURE OF THE INVENTION

An object of the present invention, therefore, is to provide a conveyor, especially a carousel conveyor, having an enhanced means for displaying indicia to the receiver of items mounted on the conveyor.

The present invention is an improvement to a conveyor wherein plates or panels that carry the items on the conveyor include indicia to continuously display information as the plates or panels pass an observer perhaps waiting to remove the items from the conveyor. The conveyor includes a means to support the panels and a means to transport the panels in sequence one after the other from first to last and again repeating with the first panel. The indicia is placed on a viewable section of the panels. A plurality of sequentially placed panels can display an entire scene or advertisement, with each panel containing a portion of the total scene.

In particular the improvement to the conveyor, which can be a circular or oval shaped baggage carousel, includes a plurality of sheets of a thin, smooth, slippery material with each of the sheets having visual information printed thereon. Means then are included for fastening each of the plurality of sheets to a flat surface of one of the plates of the carousel or conveyor. A series of the plurality of sheets are mounted on adjacent plates to depict a single scene. A taped strip can be fastened to each of the panels of the conveyor having a sheet fastened to the panel. The taped strips are fastened to the section of each of the panels with the sheets at the section that is covered by the adjoining trailing plate when the panel is operating within the conveyor or carousel operation. An adhesive can be used to fasten each of the plurality of sheets to the panels as well as fastening the taped strips to the overlapping section of the panels. Each of the sheets can be fastened only to the exposed viewable section of the panel as it is in operation on the conveyor. The sheets can be made of a thin layer of a plastic material, for instance. Sheets can also include holes drilled therethrough with the sheets then fastened to each of the panels by a snap rivet. Screws could be substituted for the snap rivets if desired.

A method for depicting visual information on a conveyor or a carousel which includes a plurality of panels forming the support for the items carried by the conveyor includes the steps of first obtaining a self-supporting thin layer of material and cutting the material to the size of each panel of the conveyor, particularly covering the viewable section of the panel. The visual information required is then formed on each of the cut layers of material that is to be exposed on the panel. The thin layer of material with the formed visual information is then fastened to an associated panel of the conveyor. An elongated strip of a flexible slippery material is then fastened to an edge of each of the panels of the conveyor on an edge of the panel where it is overlapped by an adjacent panel to form the complete item support for the conveyor or the carousel. The step that fastens the thin layer of material to an associated panel can include the steps of drilling a series of matching holes through the layer of material and its associated panel and holding the material to the panel by inserting plastic rivets into the drilled holes.

Another method for depicting visual information onto a conveyor or a carousel, in particular having a plurality of panels forming the support for the items carried by the conveyor or carousel, includes the steps of fastening a first elongated strip of a flexible, smooth, slippery material to an edge of each of the panels of the conveyor, the edge being along a side of each plate where it is overlapped by an adjacent plate to form the item support of the conveyor or the carousel. The visual information is formed on a first side of a flexible sheet of material with an adhesive applied to a second side of the sheet of material. A smooth, slippery coating is then applied to the formed side of the obtained sheet of material. The flexible sheet of material is then attached to adjacent series of the panels of the conveyor or carousel by pressing the adhesive to the panels when the panels are adjacent to each other to form the total information required. The attached flexible sheet of material is then cut to the size of the exposed section of each panel. A second elongated strip of a flexible slippery material is then fastened to an edge of each of the panels having the layer of material fastened thereto. The edge where the elongated strip is fastened is a side of each of the panels where it overlaps the adjacent panel to form the item support of the conveyor or the carousel. Each of the panels can be removed from the conveyor before the first elongated strip is fastened to an edge of the panel. The panel is then replaced after the step of fastening the first elongated strip to the edge of the panel.

The conveyor and/or the baggage carousel can be a standard well-known conveyor having a series of adjacent plates or panels and in particular a carousel having a series of panels with each panel overlapping one adjacent panel and in turn being overlapped by its trailing adjacent panel. The panels can be attached to support bars connected to rollers which follow a track or rails formed such as a continuous belt conveyor or as a circular baggage carousel configuration covering an elongated oval where the exposed sections of the plate are rectangular along the elongated section of the oval and form a rhomboid when the plates further overlap to cover the circular ends of each oval. Means are included such as an electrical motor to pull the support bars over the rails with the support bars interconnected to each other by a chain, for instance. The plates or panels can be fastened to each of the support bars by screws. The baggage carousel can include an upper rail enclosing a platform together with a baggage loading means which could be a belt conveyor carrying the baggage from the hidden loading area to the baggage carousel. The baggage is unloaded by the belt conveyor onto the baggage carousel and contained by a lower rail to avoid spilling the baggage from the baggage carousel.

An object of the present invention, therefore, is to provide an enhanced baggage carousel by providing indicia visible to a person removing items from the carousel.

Another object of the present invention is to provide a conveyor which could be a baggage carousel having individual sheets of indicia fastened to individual plates of the conveyor.

Yet another object of the present invention is to provide a conveyor or a baggage carousel wherein a length of indicia is fastened to a series of the plates and then size adjusted to the panels.

Still another object is to provide a conveyor such as a baggage carousel wherein the indicia placed onto the panels of the conveyor are protected by a smooth, slippery material as the panels move over and against the indicia.

Another object is to provide a method of fastening the indicia to the panels of the conveyor.

These and other objects will become clearer as the description of the present invention continues.

BRIEF DESCRIPTION OF DRAWINGS

The various novel features of this invention along with the foregoing and other objects, as well as the invention itself both as to its organization and method of operation may be more fully understood from the following description of illustrated embodiments when read in conjunction with the accompanying drawings wherein:

FIG. 1 is a perspective view of a section of a baggage carousel useful with the present invention;

FIG. 2 is an exploded view in perspective showing the individual panels of the baggage carousel of FIG. 1;

FIG. 3 is a close-up view of adjacent panels of the baggage carousel of FIG. 2 with a plurality of plates removed from the carousel;

FIG. 4 shows a section of the panels of the carousel of FIG. 2 with the plates prepared as per FIG. 3 and attached to the carousel;

FIG. 5 shows a series of the panels of the carousel of FIG. 1 being prepared for one embodiment of the indicia according to the present invention;

FIG. 6 shows a section of the panels of the carousel as prepared in FIG. 5 with the partitioned indicia attached;

BEST MODE FOR CARRYING OUT THE INVENTION

Figure 7:
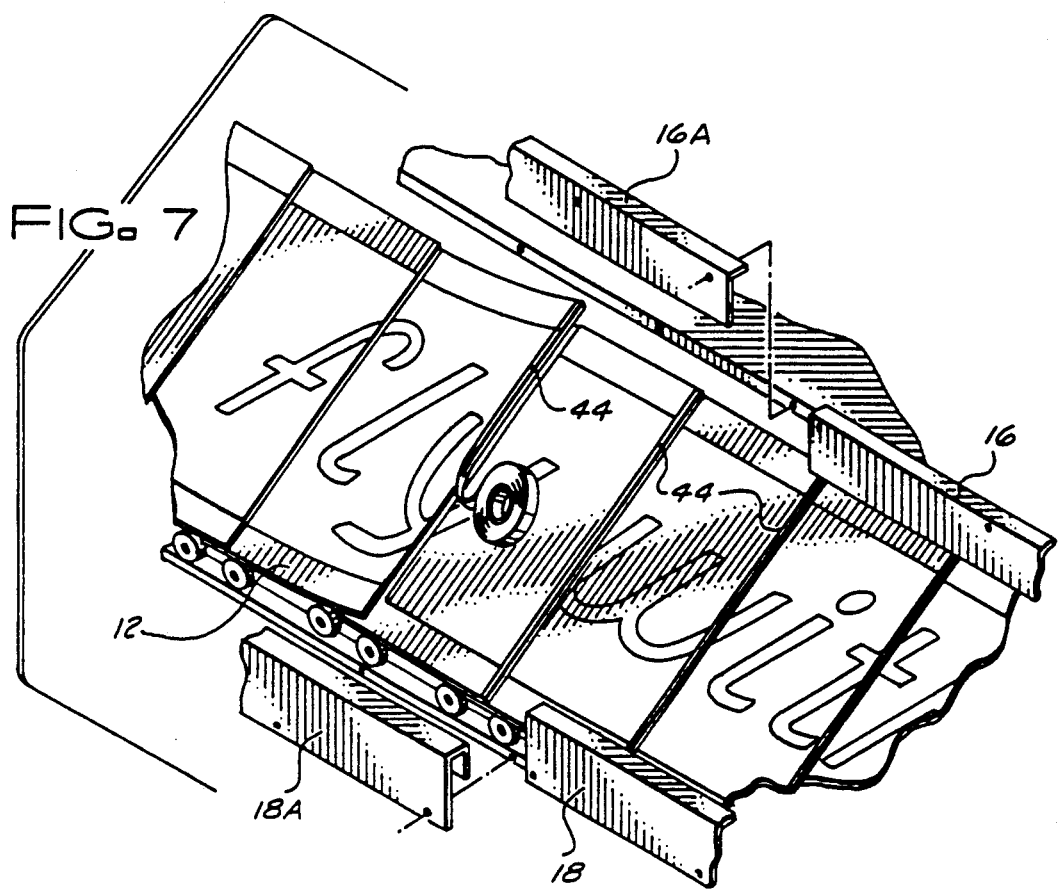
FIG. 7 shows a section of the panels of the carousel further prepared after containing the indicia as applied in FIG. 6.

The present invention is especially adapted for use with conveyors in general and especially a baggage carousel well-known in airports for instance. With the indicia added to panels of the carousel, a series of pictures can be placed together to cover one full landscape or advertisement to a person waiting to collect their baggage after arrival at the airport yet enable the person to observe the entire scene displayed around the entire circumference of the carousel. The panels of the carousel are placed at an upwardly tilting angle which makes the carousel especially adapted for use with the present invention. Through the present invention, the indicia is protected from the loading and unloading of the baggage as well as the interface between adjacent plates, especially as the plates pass around a curve formed in the carousel that permits the continuous displaying aspect of the carousel. The additional of the present invention to an oblong carousel is mainly for the preferred embodiment or best mode of the invention but it should not be taken to limit the application of the invention only to the carousel conveyor. The present invention is adaptable to a belt conveyor with the indicia placed on the individual sections, that is, the panels or the plates, of the conveyor.

FIG. 1 shows a section of a baggage conveyor carousel that is useful with the present invention. As shown in FIG. 1, a baggage receiving carousel 10 includes a plurality of panels or plates 12 that move around the periphery of the carousel 10 to carry the baggage around the carousel to the people standing waiting to receive their baggage. The panels 12 are upstanding between an elevated platform 14 with an upper rail 16 around its periphery and a lower rail 18 around the periphery of the entire carousel. A section is cut out of the elevated platform 14 for a baggage loading means such as a belt conveyor 20. The belt conveyor 20 carries the baggage from a baggage loading area 22 which is generally placed at a lower level. The belt conveyor 20 carries the baggage up to the height of the platform 14 to slide the baggage onto the panels 12. Since the panels 12 are at an inclined angle, the baggage will slide down the panels 12 from the level of the upper rail 16 down to the level of the lower rail 18. The panels 12 are generally essentially rectangular shaped, especially along the straight runway section of the carousel 12, and then the trailing plate 12 slides over its preceding adjacent plate to accomplish the 180 degree turn around the end of the oval section of the carousel 10. FIG. 2 shows a cutaway section of the carousel to show the individual panels 12 and a section of the transport means that causes the panels 12 to be transported around the circumference of the carousel 10.

Referring to FIG. 2, an upper rail section 16A is shown removed from the remaining portion of the upper rail 16. Likewise, a lower rail section 18A is removed from the periphery of the carousel 10 from the remaining section of the lower rail 18. This then permits the panels 12 to be removed from the transport system itself. The panels 12 are fastened by screws for instance to a plurality of support bars 24 spaced apart and interconnected between adjacent support bars 24 by a plurality of chains 26. Each support bar 24 has preferably two rollers 28 fastened at each end for moving along a track 30 on which the rollers 28, the support bars 24, and therefore the panels 12 are supported. Generally an electric motor drive (not shown) causes the support bars 24 to move around the periphery of the carousel 10. The interconnecting chains 26 pull the support bars 24 along the track 30. A series of the panels 12 can be easily removed from their associated support bars 24 by removing the screws holding each panel 12 to its support bar. The removal of the panels 12 permits the indicia, according to the present invention, to be attached to each of the panels 12 or a series of the panels 12 as will be described in the following figures.

Referring now to FIG. 3, each of the panels 12 include a viewable section 32 and an overlapping section 34. A length of a spacer tape 36 is affixed to the overlapping section 34 by an adhesive for instance. The spacer tape 36 permits the easy sliding of a trailing panel 12 to slide over its adjacent leading panel without rubbing over the surface of the viewable section 32 of each panel 12. This is to stop the trailing panel from rubbing off the indicia that will be placed on the viewable section 32 as shown in FIGS. 5 and 6 and discussed later. The panel 12 can then be refastened to its associated support bar 24 as is shown in FIG. 4. All of the panels in the carousel are prepared as shown in FIGS. 2, 3, and 4, first to remove each panel as shown in FIG. 2, next, to place a spacer tape 36 on an overlapping section of each panel 12 as shown in FIG. 3, and then to replace each panel 12 back onto its support bar 24 as shown in FIG. 4.

FIG. 5 shows the further preparation of the replaced panels as shown in FIG. 4. A decorative border 38 is placed onto the viewable section 32 of each of the panels. For instance, an decorative border 38 could include a plurality of lengths of single or double adhesive sided tape adhered to a top section of each of the panels 12 to cover the full width of the viewable section 32. This is just one of the decorative border 38 which could be used because an adhesive could be placed over the entire viewable section 32 of each of the panels. The only requirement is that the panels be prepared for causing the indicia to adhere to each of the panels 12 as is shown in FIG. 6.

As shown in FIG. 6, an indicia scene 40 is attached to each panel 12 by an adhesive for instance. The indicia scene 40 may cover a series of the panels 12 and, in that circumstance, a knife 41 for instance could be used to separate and cause a section of the indicia 40 to be individually adhered to an individual panel 12. After the indicia scene 40 is attached to each of the panels 12, the indicia is covered by a clear, translucent, slippery, protective material 42 to protect the indicia from being scratched or rubbed off either by the panels as they cross each other around the curved section of the carousel 10 or by the baggage itself as it is transported down the inclined plane of the panels 12 as the baggage slides from the top of the panels 12 to the bottom or lower rail 18. The protective material 42 can be individually placed over each of the viewable sections 32 of the panels 12 or can be put on as a long length as shown in FIG. 6 and then cut into the individual sections for each of the panels 12. The completion of the panels 12 with the indicia attached is shown in FIG. 7.

Referring to FIG. 7, a transparent leading edge tape 44 is placed over the leading edge of each panel 12 to protect the indicia and the clear protective layer 42 from being rubbed off as each panel is transported around the carousel. The upper rail portion 16A that was removed as shown in FIG. 2 to gain access to the individual panels 12 is now replaced. Likewise, the removed lower rail section 18A is also replaced.

Figure 8:
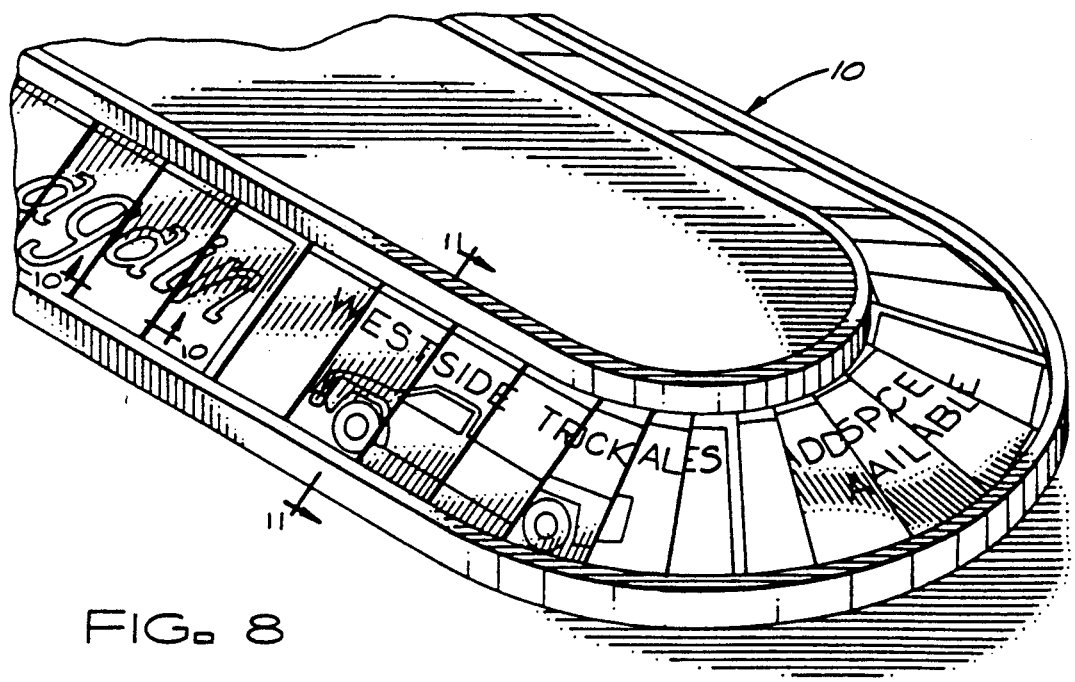
FIG. 8 shows the carousel of FIG. 1 with the indicia attached according to the present invention.
Figure 9:
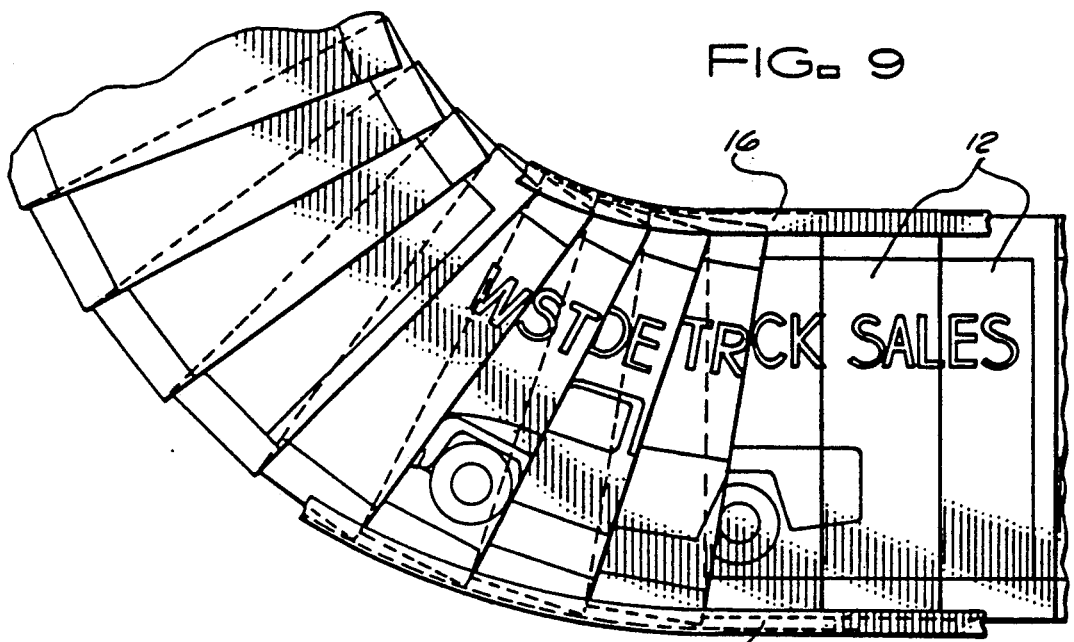
FIG. 9 shows a portion of the oval section of the carousel of FIG. 1 to show the overlapping panels of the carousel.

FIGS. 8 and 9 show the completed carousel 10 with the indicia placed onto the panels. FIG. 8 shows a running straightaway portion of the carousel to show the indicia as displayed in a series of panels for advertising purposes for instance. A plurality of the panels 12 can be used to tie together one scene or advertisement. FIG. 9 shows the overlap of the panels 12 as the panels are completing the bend around the oval and approaching a straightaway. The panels 12 overlap each other such that the trailing panel overlaps its preceding or leading panel. As the panels 12 approach the straightaway again, the indicia is spread out to again show the interconnection of the series of panels 12 to display the complete scene according to the present invention.

Figure 10:
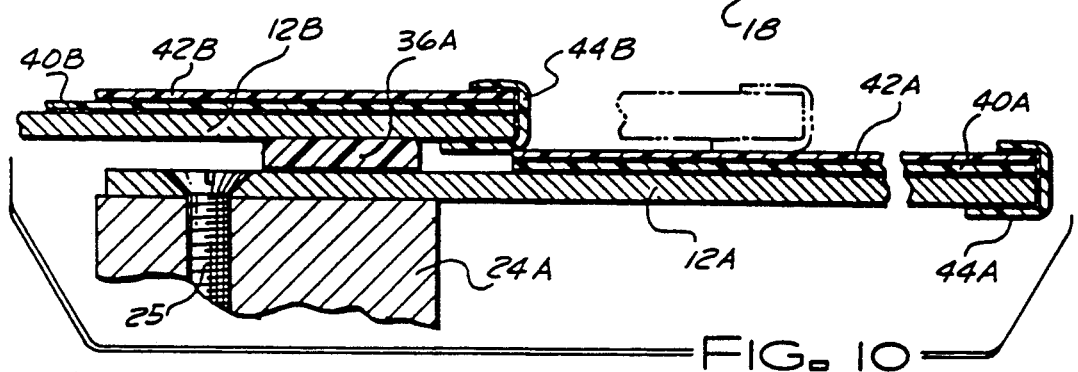
FIG. 10 is a sectional view taken along lines 10—10 of FIG. 8.

A cross sectional view of the interaction between adjacent plates is shown in FIG. 10. In FIG. 10, a preceding or leading panel 12A is shown connected to its support bar 24A by a screw 25. A spacer tape 36A is shown fastened to the lower panel 12A together with an indicia section 40A which adheres directly to the panel 12A and a clear protective layer section 42A which in turn adheres to the indicia layer section 40A. A leading edge tape section 44A is shown wrapped around the leading edge of the panel 12A. A trailing panel 12B is shown pressing against the spacer tape 36A of the panel 12A. The panel 12B likewise includes a portion of the indicia 40 shown by the reference number 40B and a clear protective layer section 42B of the protective layer 42. All of the panels in the entire carousel 10 interact as shown in FIG. 10 and are prepared according to FIGS. 5, 6 and 7. Trailing panel 12B therefore also includes its associated leading edge tape 44B which touches the leading panel 12A as shown in FIG. 10.

Figure 11:
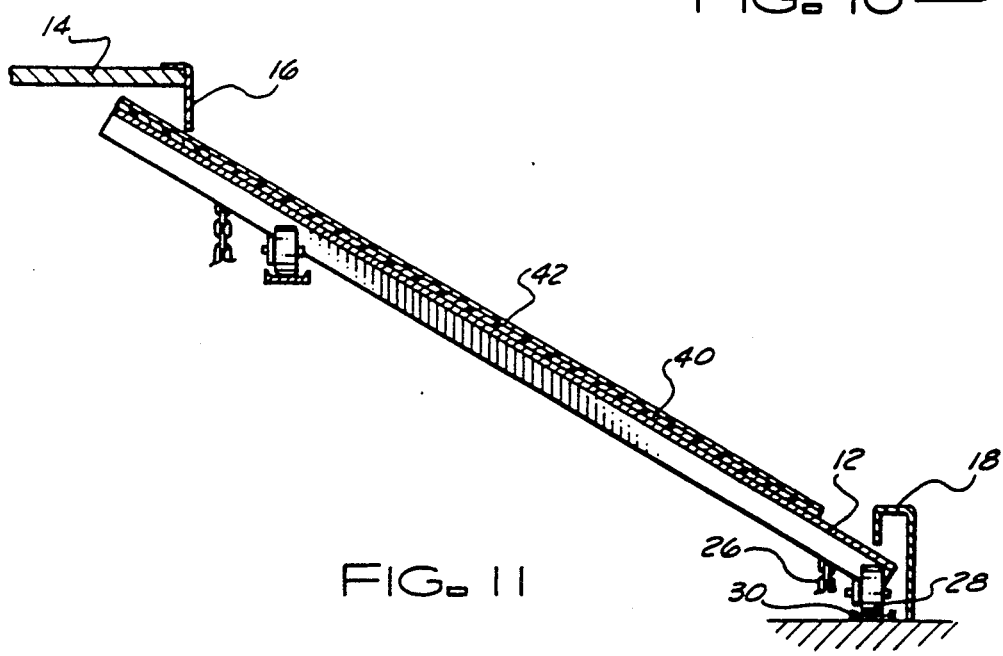
FIG. 11 is a sectional view taken along lines 11—11 of FIG. 8.

FIG. 11 shows a cutaway section of the panel taken along the straightaway. FIG. 11 shows the inclined position of each of the panels 12 and shows the interaction of the support bar 24 together with the rollers 28 and the track 30 of the carousel. A partial section of the chains 26 is also shown in FIG. 11. The position of the panel with respect to the lower rail 18, the upper rail 16 and the platform 14 are also shown. The indicia layer 40 and the clear protective layer 42 are shown placed onto the panel 12. Since in the usual baggage carousel the panels 12 are placed in an upward incline, the observer can see the indicia when standing adjacent to the lower rail 18 awaiting the baggage that will be carried by the carousel and in particular by the panels 12. The entire indicia is easily visible, especially because of the upwardly inclined angle.

Figure 12:
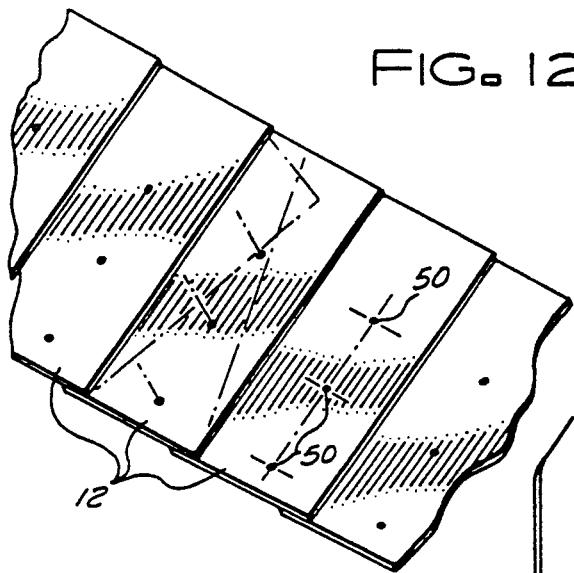
FIG. 12 shows the series of plates of the carousel of FIG. 1 with the panels or plates prepared for a second method of attaching the indicia to the carousel.
Figure 13:
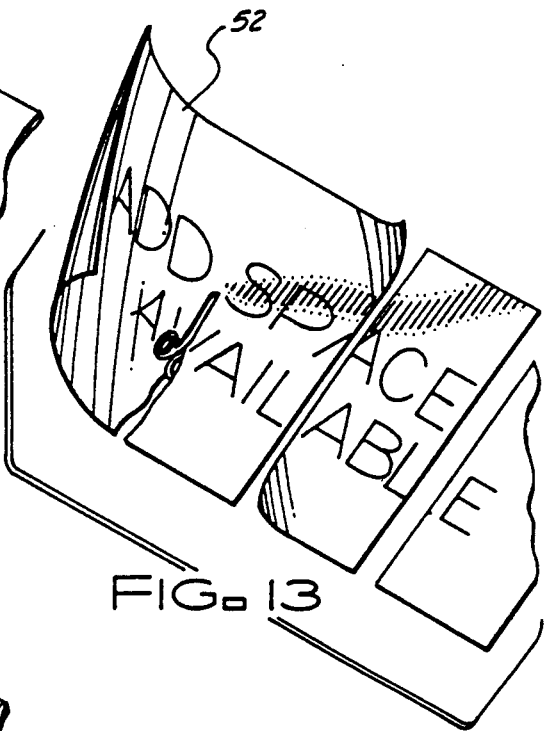
FIG. 13 shows the preparation of the indicia for attachment to the panels as prepared in FIG. 12.
Figure 14:
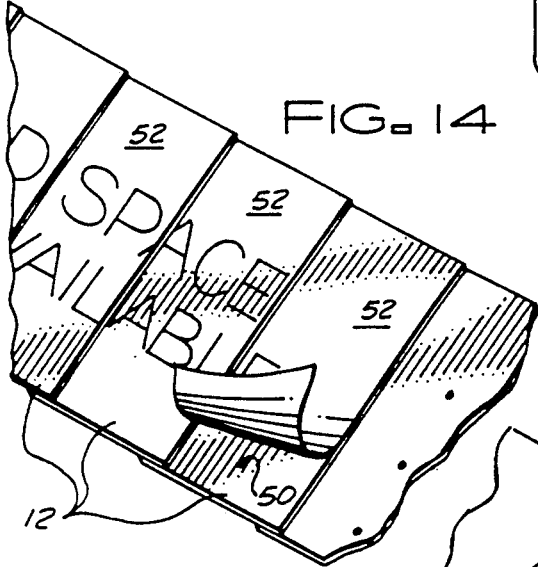
FIG. 14 shows the attachment of the indicia as prepared in FIG. 13 to the panels of the conveyor as prepared in FIG. 12.

FIG. 12-16 show another method of fastening the indicia to the panels 12 of the carousel. As shown in FIG. 12, each of the panels 12 are prepared by drilling a plurality of holes 50 into each panel. Sheets of indicia 52 are separated and then fastened to each panel by an adhesive for instance as shown in FIG. 13. As is well understood, the indicia 52 may be individually placed upon each of the panels or may be spread out over a plurality of the panels and cut apart separately as is shown in FIG. 13. FIG. 14 shows each indicia sheet 52 covering the holes 50 in each of the panels 12. The indicia 52 may be spread out over a plurality of the panels 12 to form a single visual representation.

Figure 16:
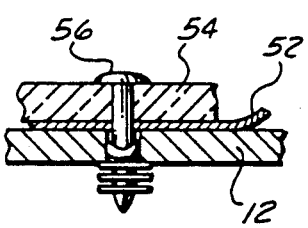
FIG. 16 is a cutaway sectional view taken along lines 16—16 of FIG. 15 to show one means of fastening the indicia and its protection to the panels of the conveyor according to the present invention.
Figure 15:
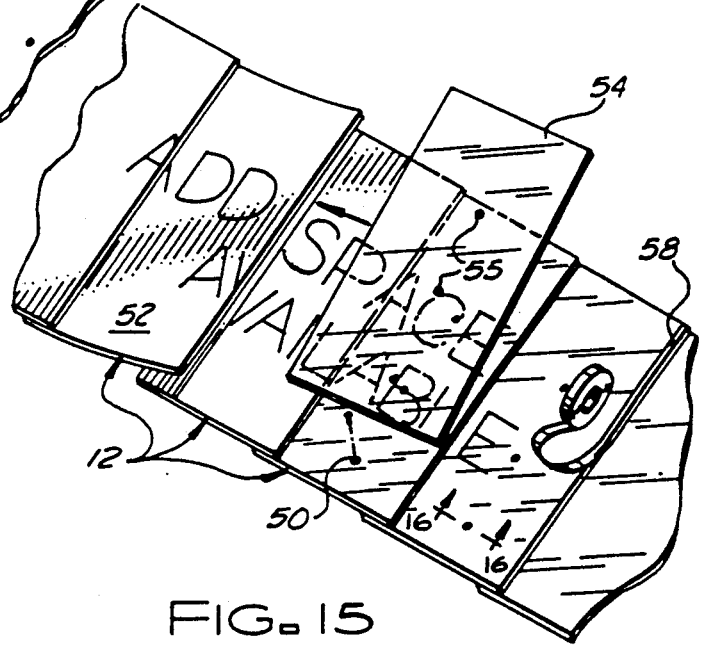
FIG. 15 shows the attachment of protective pieces of material placed over the indicia as shown in FIG. 14.

As shown in FIG. 15, the next step is to prepare a plurality of plastic protective lamina 54 having the same length and width dimensions as the panels 12. These lamina can be made of a Lexan plastic for instance which will provide a protection for the indicia beneath the lamina 54 as well as providing a slippery sliding surface between the adjacent lamina 54 and panels 12 as they pass around the round end of the oval of the carousel. Each of the protective lamina 54 also include a plurality of mating holes 55 to match the holes 50 already formed through each panel 12. Each protective lamina 54 is placed over its associated panel 12 by lifting the trailing associated panel 12 and sliding the protective layer 54 over the surface of the indicia sheet 52 and its associated panel 12. Plastic rivets 56 for instance can be used to fasten the protective layer 54 to each panel 12 by passing the rivets through the holes 55 in the protective lamina 54 and through the holes 50 of the panels 12 as is shown in FIG. 16. A protective leading edge tape 58 can be placed over the leading edge of each of the panels 12 to protect the edge of the indicia and the protective layer 54 in a manner similar to that used for the panels 12 prepared as shown in FIG. 7.

Thus a method for preparing panels of a baggage carousel comprises the steps of removing each plate 12 in sequence as is shown in FIG. 2. The spacer tape 36 is then placed onto the overlapped section 34 of each of the panels 12. The spacer tape 36 permits the entire surface of each panel 12 to be level once the indicia 40 and the clear plastic 42 is placed ever the viewable section 32 of each panel 12. The placement of the spacer tape 36 onto each panel is shown in FIGS. 3 and 4. The indicia is then prepared to fit either one panel or generally and preferably to fit a series of the panels 12. The indicia is prepared onto a sheet of plastic or a similar material through a silk screening process for instance. An adhesive can be applied to the unprinted side of the indicia 40 or each panel can include the strip of adhesive material 38 as is shown in FIG. 5. Preferably a strong adhesive is applied to the unprinted side of the indicia and then the indicia is placed over each plate or series of plate as is shown in FIG. 6. As was described for FIG. 6, the indicia scene 40 can be individually cut to size according to the viewable section 32 of each panel 12 or the indicia can be placed over a series of the panels 12 and then cut to size by a knife for instance after being placed over the series of panels. The clear polycarbonite or plastic protective coating 42 is then placed over the indicia 40 also as is shown in FIG. 6. The protective layer 42 should be of a tough plastic to prevent the baggage and the movement between each of the panels 12 from harming the indicia 40. The indicia and the clear protective layer 42 are cut such that each of the panels 12 can move freely when traveling down the straightaway section of the carousel 10 or when turning around the end of the oval section of the carousel 10. Then the leading edge tape 44 is placed over the leading edge of each of the panels 12 as is shown in FIG. 7. This leading edge tape 44 protects the exposed edge of the indicia 40 and the clear protective layer 42 at the leading edge of each of the panels and keeps the leading edge of each panel 12 from rubbing against the indicia sheet 40. The leading edge is exposed and therefore can be easily damaged by contact with the sliding baggage. The leading edge tape 44 should be wrapped around the exposed edge of each of the panel such that an equal amount of tape is on the top of the panel as is on the bottom as is shown in FIG. 10.

Another method for preparing the carousel to include the indicia of the present invention is shown in FIGS. 12-16. First a plurality of holes, three shown in FIG. 12, are drilled for instance through each of the panels 12. The number and size of the holes depend upon the size of each of the panels 12, more could be included if the panel is larger or a lesser number of holes could be drilled for instance if the panel was smaller. The holes 50 must be formed through each panel 12 in a position such that the hole will not come in contact with the leading edge of the plate 12 when the plate is traveling around a curved section for instance of the carousel. The indicia 52 is then prepared either on a plastic material or a standard grade of paper. The advertisement for instance can be printed upon the paper or the plastic material, or a silk screening could be used to prepare the indicia layer 52. As before, the width of each section of the indicia 52 is determined when the panels 12 are placed along the straightaway section of the carousel 10. The indicia 52 covers at least the viewable section of each of the panels as was previously discussed in FIGS. 3 and 14. Each section of the indicia 52 need not be firmly adhered to its associated panel 12. The section of the protective panel 54 is then prepared by using a one-eighth inch thick, for instance, layer of plastic. The length and width dimensions of the protective layer 54 preferably are the same as the panels 12 as discussed with FIG. 15. The holes 55 are formed through the plastic by drilling for instance to exactly meet with the holes 50 previously formed into each of the plates 12. Each of the protective panels are placed over at least the viewable section of each of the plates 12 and the plastic rivets 56 are then pressed through the holes 55 in the panel 54, through the indicia 52 and through the holes 50 formed into the plates 12 as is shown in FIG. 16. Since the protective panels 54 preferably are the same size as the plates 12, the leading edge of the panels 12 must be lifted and the protective layer 54 must be placed under the leading edge of the trailing panel 12. This permits the panels to slide over the protective layer 54 and thereby protects the indicia 52 from damage especially when the plates make the bend around the curve in the oval. As before, a leading edge tape 58 can be placed over the leading edge of each of the panels 12 which contain indicia 52 and the protective layer 54 as is shown in FIG. 15. Again, an equal amount of the leading edge tape 58 should be placed on top of the protective sheet 54 and on the bottom of the panel 12 in a manner similar to that shown in FIG. 10 for the leading edge tape 44.

The principals of the present invention have now been made clear in an illustrative embodiment. There will be immediately obvious to those skilled in the art many modifications of structure, arrangement, proportion, the elements, materials, and components used in the practice of the invention. For instance, an oval baggage carousel is shown as the preferred embodiment of the present invention in FIG. 1. It should be obvious that any geometric configuration of the conveyor could be operated according to the present invention to include the indicia as taught herein. Different types of conveyors are anticipated by the present invention. A belt conveyor could be used for instance with the indicia placed across each section of the belt. The only necessity is that the indicia be flexible to form around the end of the conveyor as the belt itself returns on the underside of the belt.conveyor. Any type of indicia is contemplated by this invention including advertisement or merely a colorful display. The appended claims are, therefore, intended to cover and embrace any such modification, within the limits only of the true spirit and scope of the invention.

INDUSTRIAL APPLICABILITY

The present invention is capable of being exploited in any situation where persons wait at conveyors. The present invention is particularly appropriate for airports and other locations where baggage is dispensed using conveyors and persons must observe the conveyors to find their baggage.

I claim:

1. In a conveyor (10) including a plurality of baggage carrying panels (12) a plurality of support bars (24), one for each panel (12); means for supporting the support bars (24) in a spaced apart position along the distance covered by the conveyor (10) in a repeat pattern from beginning to end to beginning; means for fastening each panel (12) to one support bar (24); and means for transporting the support bars (24) and the panels (12) along the support means (28); the panels (12) being arranged at least immediately adjacent each other to provide at least a viewable portion (32) of the panel (12) that is visible when the conveyor (10) is operating; wherein the improvement comprises: a protective lamina having visual information, fastened to the viewable portion (32) of at least one panel (12), protecting the visual information, and each of the panels (12) overlaps its immediately preceding panel (12) to produce an overlapped section (43) on the face of the preceding panel (12), and further including a length of tape placed along the length of the preceding panel (12) on its overlapped section (34) to act as a spacer (36) between the overlapped section (34) of the preceding panel (12) and the immediately adjacent following panel (12).

2. In a conveyor as defined in claim 1 wherein a series of the protective lamina cover adjacent panels (12) and depict a single scene.

3. In a conveyor as defined in claim 1 wherein the means for fastening said protective lamina to the viewable portion (32) of the at least one plate (12) includes an adhesive.

4. In a conveyor as defined in claim 1 wherein said protective lamina includes a thin transparent protective layer of material (42) covering a sheet (40) having viewable information placed therein.

5. In a conveyor as defined in claim 4 further including said thin protective layer of material (42) having a size equal to the size of said panel (12), one of said thin layer of material (42) provided for each of the sheets (40) and fastened over said sheet (40) to the panel (12) for protection of said sheet (40).

6. In a conveyor as defined in claim 5 wherein each of the panels (12) includes holes (50) formed therethrough, said protective layer (54) of protective material including holes (55) formed therethrough matching the holes formed in its associated panel (12), and the means for fastening each of said protective layers (54) and said sheets (52) to its associated plate (12) includes a plurality of plastic rivets (56), one for each of the holes formed in the panels and in the protective layers.

7. In a conveyor as defined in claim 1 wherein the plurality of support bars (24) are placed in an upwardly inclined angle and the means for supporting the support bars are placed in an oval configuration to form a carousel.

8. In a conveyor (10) including a plurality of baggage carrying panels (12), a plurality of support bars (24), one for each of said panels (12), means for supporting said support bars (24) in a spaced apart position along the distance covered by the conveyor in a repeat pattern from beginning to end to beginning, means for fastening each of said panels (12) to one of said support bars (24), and means for transporting said support bars (24) and said panels (12) along said supporting means, said panels being arranged at least immediately adjacent each other to provide at least a viewable portion (32) of said panel (12) that is visible when the conveyor (10) is operating, wherein the improvement comprises:

at least one sheet (40) of a thin slippery material, said sheet (40) having visual indicia information printed thereon, wherein each of said panels (12) overlap its immediately preceding panel (12) to produce an overlapped section (34) on the face of said preceding panel (12);

a length of a slippery faced leading edge tape placed along the length of the preceding panel (12) in its overlapped section (34) to act as a spacer (36) between the overlapped section (34) of the preceding panel (12) and the immediately adjacent following panel (12); and a thin transparent layer of material (42) covering each of the sheets (40) having visible indicia placed thereon.

9. In a conveyor as defined in claim 8 wherein a series of the sheets (40) cover adjacent panels (12) and depict a single scene.

10. In a conveyor as defined in claim 8 further including at least one protective layer of a self-supporting thin layer of material (42) having a size equal to the size of said plates (12), said at least one protective layer covering each of said at least one sheet of indicia containing material.

11. In a conveyor as defined in claim 10 wherein each of said plurality of panels (12) include holes drilled therethrough and each of said plurality of sheets (40) also includes holes formed therethrough in the same pattern as the holes formed in said panels (12), and the means for fastening each or, said sheets and each of said protective layers to said panel includes plastic rivets (56).

12. In a method for depicting visual information onto a conveyor (10) having a plurality of panels (12) forming the support for the items carried by the conveyor (10), said method being characterized by the steps of:

obtaining a thin layer of material (40);

cutting the obtained thin layer of material to the size of each panel (12) of the conveyor (10);

forming visual information on each cut layer of material (40), the visual information covering a section of a layer of material (40) that is to be exposed when placed on the conveyor (10);

fastening the layer of material (40) with the formed visual information to at least one of the plurality of panels (12); and fastening an elongated strip of a flexible slippery material to an edge of each panel (12) with its fastened layer of material (40), the edge being a side of each panel (12) wherein it overlaps the adjacent preceding panel (12) that forms the items support of the conveyor (10).

13. In a method as defined in claim 12 wherein the step of fastening the layer of material (40) to its associated panel (12) includes the steps of drilling a series of matching holes through the layer of material (40) and its associated panel (12), and inserting plastic rivets (56) into the drilled holes.

14. In a method as defined in claim 12 further including the step of fastening a self-supporting thin protective layer of a material (42) having a size equal to the size of the panels (12), one of said protective layers (42) provided for each layer of material (40) having visual information formed thereon.

15. In a method for depicting visual information onto a carousel (10) having a plurality of panels (12) forming the support for the items carried by the carousel (10), each panel (12), when transported by the carousel (10), having a viewable section (32) and an overlapping section (34) wherein each trailing panel (12) overlaps its preceding panel (12), said method being characterized by the steps of:

removing at least a section of the plurality of panels (12) from the conveyor;

placing a strip of a smooth slippery tape on the overlapping section (34) of each removed panel (12);

replacing the removed panels (12) with the tape onto the carousel (10);

printing an indicia scene onto an obtained thin flexible layer of material (40);

applying an adhesive to a side of the obtained layer opposite to the printed indicia scene;

cutting the obtained layer of material (40) with the printed indicia scene and the applied adhesive to at least the size of the viewable section (32) of at least one panel (12);

fastening the cut layer of material (40) to the at least one panel (12); and applying a transparent flexible tape to a leading edge of the panel (12) trailing the at least one panel (12) containing the fastened cut layer of material (40).

16. In a method as defined in claim 15 further including the step of fastening a transparent protective layer of material (42) over said fastened cut layer of material (40) to the at least one panel (12) before the step of applying the transparent flexible tape.

17. In a method as defined in claim 15 wherein the step of printing an indicia scene covers the obtained thin flexible layer of material to a surface size that covers a plurality of panels (12) and the step of cutting the obtained layer of material with the printed indicia scene and the applied adhesive, cuts the layers to cover the viewable section (32) of a plurality of panels (12).

* * * * *

UNITED STATES PATENT AND TRADEMARK OFFICE
CERTIFICATE OF CORRECTION

PATENT NO. : 5,330,044

DATED : 19 July 1994

INVENTOR(S) : Dennis R. Conklin, Jr.

It is certified that error appears in the above-identified patent and that said Letters Patent is hereby corrected as shown below:

Column 9, Line 54 (Claim 1) Please replace "(43)" with -- (34) -- after the word "section".

Signed and Sealed this

Eighteenth Day of October, 1994

*Attest:*

*Attesting Officer*

BRUCE LEHMAN

*Commissioner of Patents and Trademarks*